Figure 1:
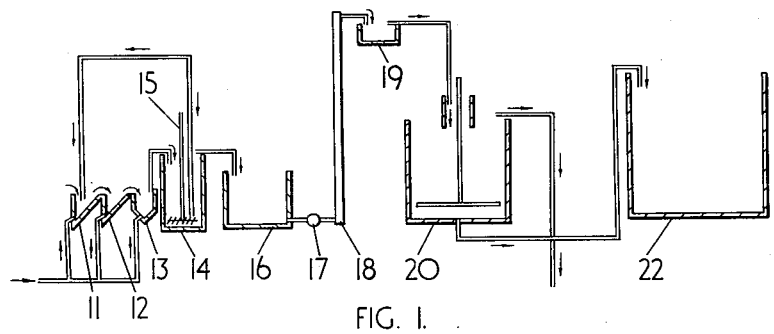

Nov. 16, 1965   H. G. GLOVER ETAL   3,218,252
PROCESS FOR THE BACTERIOLOGICAL OXIDATION OF FERROUS
SALTS IN ACIDIC SOLUTION
Filed Aug. 27, 1963

INVENTORS
Harold Gordon Glover
Jack Walesby Hunt
William George Kenyon
By Stevens, Davis, Miller & Mosher
ATTORNEYS United States Patent Office 3,218,252
Patented Nov. 16, 1965

3,218,252
PROCESS FOR THE BACTERIOLOGICAL OXIDATION OF FERROUS SALTS IN ACIDIC SOLUTION
Harold Gordon Glover, Sale, Jack Walesby Hunt, Hampton, and William George Kenyon, Haydock, St. Helens, England, assignors to Coal Industry (Patents) Limited, Grosvenor Place, London, England, a company of Great Britain
Filed Aug. 27, 1963, Ser. No. 304,908
Claims priority, application Great Britain, Aug. 31, 1962, 33,516/62; Aug. 31, 1962, 33,518/62
15 Claims. (Cl. 210—4)

This invention relates to a process for the oxidation of ferrous salts in acidic solution and has particular, though not exclusive, application to the purification of polluting acidic and ferruginous effluents, or to the regeneration of spent mineral or leach liquors of the ferruginous type.

The treatment of acidic and ferruginous effluents to render them suitable for disposal into a river presents a problem, and one example of the application of the present invention is intended to provide a process having low running costs for converting the ferrous salts in the effluents into ferric salts which can then be neutralised by treatment with an alkaline solution or substance such as limestone or lime.

According to the invention an activated sludge process for the bacteriological oxidation of ferrous salts in acidic solution, comprising the steps of subjecting the solution to the action of an active sludge comprising autotrophic iron oxidising bacteria carried on particles of solid material in a liquid suspension, by passing the solution through at least two containers in series, in which containers said active sludge is maintained; recovering by sedimentation sludge appearing in the outflow of the last container of the series; and returning the recovered sludge to the first container of the series.

The solid material is preferably iron oxide, or may be finely ground colliery shale. The iron oxide referred to may be that precipitated during operation of the process.

By an "activated sludge process" is herein meant a process in which material to be treated and a sludge conditioned to treat the material are together passed through a container or tank and subjected to aeration, the sludge being subsequently separated from the material and recirculated through the container together with further material to be treated.

In a particular form of the invention, the iron-oxidising bacteria used are believed to be micro-organisms known as autotrophic ferro-bacillus ferro-oxidans.

In one form of the invention an additional process for neutralising ferric and/or aluminum salts in acidic solution involves passing the solution through a reactor containing limestone grit and subjecting the limestone grit to the action of a mechanical attrition device. The limestone grit is preferably in the form of an expanded bed and the solution is preferably passed upwardly.

We are aware that it has been proposed to neutralise acid effluents by the use of limestone, but this process has not been successful for acidic solutions of ferric and aluminum salts since formation of a coating of ferric or aluminum hydroxide on the limestone particles prevents further progress of the reaction. For the continous neutralisation of acidic ferruginous effluents containing ferric and/or aluminum salts in solution, prior to disposal of the liquor in a watercourse, the use of limestone has the advantage of cheapness over other currently available alkaline substances and also has the advantage that it precipitates a more compact and easily filtered sludge than is possible using stronger alkalies.

Figure 2:
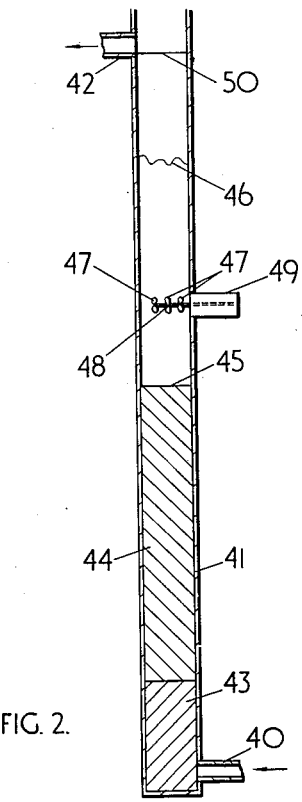

One embodiment of the invention will now be described with reference to the accompanying drawings, in which:

FIGURE 1 is a diagram of a plant according to the invention for treating acidic ferruginous effluents, and FIGURE 2 is a section through a reactor (18 in FIGURE 1) containing an expanded bed of limestone grit.

The acidic solution or liquor containing ferrous salts is fed to hopper-shaped oxidation tanks 11, 12 and 13 arranged in series. The outflow from tank 13 passes to a sludge recovery tank 14, constituted by a flat-bottomed drum fitted with a slowly revolving rake 15. The rake serves to push the jelly-like sludge towards an air lift inlet whence it is carried by an air flow back to the first oxidation tank 11. Air for aerating the liquid suspension in tanks 11, 12 and 13 is supplied through a suitable arrangement of perforated pipes. It will be appreciated that since the solution under treatment is corrosive, the materials of the various vessels and pipes should be chosen to be appropriately corrosion resistant. The oxidation tanks 11, 12 and 13 contain an activated sludge comprising motile, iron oxidising bacteria present in or on a suspension of particles of iron oxide which have been precipitated during the operation of the process.

The liquid from the sludge recovery tank 14 in which liquid almost all the ferrous salts have been oxidised to ferric salts passes to a storage tank 16, whence it is fed by a pump 17 to flow through a reactor 18 in which the ferric salts are neutralised.

The liquor containing ferric and, in the case of a mine effluent, aluminum salts and sulphuric acid in storage tanks 16 is fed, by means of pump 17, vertically upwards through a reactor 18 containing an expanded bed of limestone grit. The reactor is provided with a mechanical attrition device in the form of a rapidly rotating impeller (shown in FIGURE 2) and this device acts to chip away the ferric or aluminum hydroxide coating which forms on the limestone particles during operation of the process. It has been unexpectedly found that the limestone can be kept in an active condition in this way without the consumption of an economically prohibitive quantity of power, and without undue loss of limestone.

The neutralised liquor from reactor 18 is passed into a small tank 19 in which any limestone grit which may have accidentally been discharged from reactor 18 is trapped by sedimentation. The liquor is then passed to a semi-continuous sedimentation tank 20, the overflow from which constitutes the purified and neutralised liquor. The sludge from tank 20 is drawn off to a sand draining bed or other suitable filter shown as tank 22.

Referring now to FIGURE 2, the liquor to be treated enters through a port 40 at the bottom of a reactor in the form of a vertical column 41, and leaves through a port 42 at the top. The bottom portion of the column 41 contains a coarse bed of unreactive material 43 whose function is to support the bed of reactive limestone grit 44. The rest level of the bed of reactive grit 44, that is, when there is substantially no inflow and the attrition device is not being operated is shown at 45, and its normal level when expanded during operation of the process is indicated at 46. A rotating blade impeller having blades or discs 47 on a shaft 48 and driven by a motor 49 is mounted with the blades projecting into the column. The normal level of the top of the liquor in the reactor is indicated at 50.

The reactor contains high calcium or dolomitic limestone grit of a mesh size 16 to 60 B.S.S. which is maintained in suspension by control of the rate of upward flow of the liquor. The mechanical attrition device is fitted to the column at such a height that it is not submerged by grit when the water is not flowing and yet is covered by grit when the process is in operation. The device has the form of a rapidly spinning disc to which are fixed projections so that the grit and water are drawn across the face of the disc and the grit particles are subjected to an abrasive or percussive action.

Typical operating details of an experimental version of the process according to the invention applied to the treatment of a mine water are as follows:

Input to tank 11, two litres per minute.

Liquid capacity of tanks 11, 12, 13 (total), 300 litres.

Equivalent retention time 150 minutes at an operating temperature of 10° C.

Operating at a liquid temperature of 2° C. requires a retention time of 300 minutes and operation at 20° C. requires 45 minutes.

|  | pH | Ferrous mg./litre Fe |
|---|---|---|
| Input to tank 11 | 2.9 | 150 |
| Liquor in tank 11 | 2.8 | 20 |
| Liquor in tank 12 | 2.8 | 4 |
| Liquor in tank 13 | 2.8 | 0.5 |
| Clear liquor leaving tank 14 | 2.8 | 0.5 |

Sludge concentrations:
  Sludge in return channel __ 40% (volume after 30 minutes settling).
  Liquor in tank 11 _____ 20% (volume after 30 minutes settling).
  Sludge return rate _____ 2 litres/min. approximately.
  Main air flow _____ 10 litres/min. to each tank, 30 litres/min. in all.
  Air/liquid supply ratio ____ 15 volumes air/volume mine-water.
  Oxidation rate, average over three process tanks _____ 1.44 g. Fe/litre of tank/ 24 hours.

Input to tank 11:
  Composition—
    Ferrous salts 100–200 mg. per litre Fe.
    Ferric salts 150 mg. per litre Fe.
    Aluminium 30 mg. per litre aluminium.
    Total dissolved solids 2,500 mg. per litre.
    Suspended solids content varies from 5 mg. per litre to several hundred mg. per litre.

Output from tank 14:
  Flow rate 2 litres per minute.
  Composition—
    Ferrous salts maximum 3 mg. per litre Fe.
    Ferric salts approximately 300 mg. per litre Fe.
    Aluminium 20 mg. per litre Al.

Operating details of the neutralisation stage are:

|  | Acidity (mg./l. CaCO₃ at boiling point) to phenolphthalein | pH | mg./l. dissolved ferrous iron | mg./l. dissolved ferric iron | mg./l. dissolved Aluminium |
|---|---|---|---|---|---|
| Composition of liquor in 16 | 1,000 | 2.9 | 3 | 300 | 20 |
| Composition of overflow liquor from 20 | Nil | 7.0 | 3 | Nil | Nil |

When treating a mine water effluent it is not normally necessary to innoculate the process with micro-organisms as these are present in the mine water in sufficient number to start the process. For the treatment of other solutions or liquors such as may be encountered in mineral recovery by leaching it may be necessary to prepare an innoculum from a natural source of micro-organisms such as an acidic mine water. It is not normally necessary when treating a mine water to add nutrient substances to support the micro-organisms but nutrients may be required for the treatment of other solutions or liquors.

The activated sludge can be left idle either aerated or quiescent for periods of several weeks with no appreciable loss of activity, but if it should be necessary to maintain the activity over longer standby periods it is convenient to add iron metal to the aerated liquor in tanks 11, 12, 13. The metallic iron dissolves to form ferrous sulphate which provides energy for the micro-organisms to continue to reproduce. The oxidation product, ferric sulphate, hydrolyses slowly to form a precipitate of hydrated ferric oxide which thus maintains the sludge in a desirable physical form. The use of iron metal has the definite advantage over any other energy source that it does not increase the concentration of polluting dissolved substances in the liquor while the process is idle.

The process specifically described herein has the following advantages:

(1) An improvement in the oxidation rate compared with some known processes.

(2) The ferric salts are neutralised rapidly and cheaply with limestone grit.

(3) The product of the oxidation stage of the process, although still acidic, no longer has an oxygen demand and so, in some cases, could be discharged to a natural watercourse.

(4) The product of the oxidation stage can be more cheaply treated with lime or other strong alkali than would be the case if it contained ferrous salts because the final pH of neutralisation of a ferric salt is about 6 whereas that of a ferrous salt is about 9.

(5) An indirect advantage of the aeration in the tanks 11, 12 and 13 is that any excess carbon dioxide gas in the solution under treatment is expelled and thus does not lead to a waste of lime.

The process according to the invention can also be advantageously applied to the regeneration of spent mineral or leach liquors by reconverting the ferrous salts therein to ferric salts. The liquor can then be used again, for example to leach copper from a copper mine waste dump. Another possible application is to the treatment prior to disposal of acidic steel pickle liquor waste water.

Examples of suitable nutrient substances which it may be desirable to add when treating ferrous solutions which are not naturally-occurring are substances containing nitrogen and phosphorus and trace metals such as copper and magnesium. In particular it may be desirable to add ammonium sulphate as a source of nitrogen and/or potassium phosphate or phosphoric acid as a source of phosphorus.

We claim:

1. An activated sludge process for the bacteriological oxidation of ferrous salts in acidic solution, comprising the steps of subjecting the solution to the action of an active sludge comprising autotrophic iron oxidising bacteria carried on particles of solid material in a liquid suspension, by passing the solution through at least two containers in series, in which containers said active sludge is maintained; recovering by sedimentation sludge appearing in the outflow of the last container of the series; and returning the recovered sludge to the first container of the series.

2. An activated sludge process for the bacteriological oxidation of ferrous salts in acidic solution, comprising the steps of subjecting the solution to the action of an active sludge comprising autotrophic iron oxidising bacteria carried on particles of iron containing solid material in a liquid suspension, by passing the solution through at least two containers in series, in which containers said active sludge is maintained; recovering by sedimentation sludge appearing in the outflow of the last container of the series; and returning the recovered sludge to the first container of the series.

3. A process according to claim 2, wherein the iron-oxidising bacteria are ferro-bacillus ferro-oxidanes.

4. A process as claimed in claim 2, wherein the solid iron containing material comprises fine shale particles.

5. A process according to claim 2, wherein the solid iron containing material comprises iron oxide particles.

6. A process according to claim 2, wherein the solid iron containing material includes iron oxide precipitated during operation of the process.

7. A process according to claim 2, wherein the solid iron containing material is metallic iron.

8. A process according to claim 2, wherein a material containing chemically bound ferrous iron is added to the suspension for the purpose of maintaining the activity of the sludge over a period.

9. A process according to claim 2, wherein nutrients for the bacteria are added to the suspension.

10. A process according to claim 2, wherein nutrient comprising nitrogen and phosphorus-containing substances are added to the suspension.

11. A process according to claim 2, wherein nutrients comprising ammonium salts, metal phosphates and traces of copper and magnesium are added to the suspension.

12. A process according to claim 2, wherein the suspension is maintained at a temperature between 2° and 20° C.

13. A process according to claim 3, wherein the concentration of ferrous salt in the acidic solution is maintained at a low value during the initial stages of operation and is subsequently increased.

14. A process according to claim 8, wherein the added material comprises iron metal.

15. A process according to claim 8, wherein the material added comprises scrap iron.

References Cited by the Examiner

UNITED STATES PATENTS

| | | | |
|---|---|---|---|
| 1,689,951 | 10/1928 | Lofland | 23—200 |
| 2,829,964 | 4/1958 | Zimmerly et al. | |
| 2,897,150 | 7/1959 | Bencowitz | 210—63 |

FOREIGN PATENTS 211,928    5/1956    Australia.

OTHER REFERENCES

Leathen et al.: F. Ferrooxidans etc., J. Bacteriol., 72 (1956) 700–704.

Rudolfs: Industrial Wastes—Their Disposal and Treatment, 1953, Reinhold, New York, pp. 249–252, 268, 269 and 334–341 relied on.

MORRIS O. WOLK, *Primary Examiner.*